(12) United States Patent
Heater et al.

(10) Patent No.: US 10,026,092 B2
(45) Date of Patent: Jul. 17, 2018

(54) LEARNING AND AUTOMATING AGENT ACTIONS

(71) Applicant: Nuance Communications, Inc., Burlington, MA (US)

(72) Inventors: John Dolan Heater, Mahwah, NJ (US); Abhishek Rohatgi, Montreal (CA); Flaviu Gelu Negrean, Montreal (CA)

(73) Assignee: Nuance Communications, Inc., Burlington, MA (US)

(*) Notice: Subject to any disclaimer, the term of this patent is extended or adjusted under 35 U.S.C. 154(b) by 0 days.

(21) Appl. No.: 15/373,879

(22) Filed: Dec. 9, 2016

(65) Prior Publication Data

US 2018/0165691 A1   Jun. 14, 2018

(51) Int. Cl.
| | |
|---|---|
| *G06Q 30/00* | (2012.01) |
| *G06F 17/30* | (2006.01) |
| *G10L 15/18* | (2013.01) |
| *G06F 17/27* | (2006.01) |
| *G10L 15/08* | (2006.01) |
| *H04M 3/51* | (2006.01) |

(52) U.S. Cl.
CPC ....... *G06Q 30/016* (2013.01); *G06F 17/2705* (2013.01); *G06F 17/2785* (2013.01); *G06F 17/30684* (2013.01); *G10L 15/1815* (2013.01); *G10L 15/1822* (2013.01); *G10L 2015/088* (2013.01); *H04M 3/51* (2013.01)

(58) Field of Classification Search
CPC .... G06Q 30/016; G06Q 30/02; G06F 3/0481; H04M 3/5175; H04M 3/5232; H04M 3/5166; H04M 3/527
USPC ............ 370/352; 379/67.1, 218.01, 265.03; 704/9, 239, 257; 705/5, 7.32, 14.4, 705/14.54, 14.64, 64, 304; 709/200, 204; 715/738
See application file for complete search history.

(56) References Cited

U.S. PATENT DOCUMENTS

| | | | | |
|---|---|---|---|---|
| 7,143,069 | B2* | 11/2006 | Lacivita ................. | G06Q 20/04 705/44 |
| 8,761,374 | B2* | 6/2014 | Evanchik ............... | G06Q 10/06 379/265.03 |
| 9,202,220 | B2* | 12/2015 | Faber ..................... | G06Q 30/02 |
| 9,787,836 | B2* | 10/2017 | Tolksdorf ............ | H04M 3/5166 |
| 9,900,438 | B1* | 2/2018 | Hollenberg ........... | H04M 3/527 |
| 2005/0025127 | A1* | 2/2005 | Strathmeyer ..... | H04L 29/06027 370/352 |
| 2006/0136545 | A1* | 6/2006 | Reistad ................. | G06Q 30/02 709/200 |

(Continued)

*Primary Examiner* — Gerald Gauther
(74) *Attorney, Agent, or Firm* — Hamilton, Brook, Smith & Reynolds, P.C.

(57) ABSTRACT

An automated system processes customer requests and interactions with a customer service representative. During such interactions, the representative's actions at a computer interface are monitored, and the dialog between the customer and representative are recorded. Based on the dialog and the actions, a script is created or updated for a given request, where the script encompasses a dialog tree and actions relating to the customer's account. When a subsequent customer submits the same or a comparable request, an automated agent utilizes the script to handle the request. Using the script, the automated agent performs a dialog with the customer, accesses the customer account, and updates the account in accordance with the request.

19 Claims, 10 Drawing Sheets

(56) References Cited

U.S. PATENT DOCUMENTS

| | | | | |
|---|---|---|---|---|
| 2006/0165066 | A1* | 7/2006 | Campbell | H04M 3/5125 370/352 |
| 2006/0171520 | A1* | 8/2006 | Kliger | G06Q 30/00 379/218.01 |
| 2006/0271364 | A1* | 11/2006 | Mirkovic | G06F 17/28 704/239 |
| 2007/0073808 | A1* | 3/2007 | Berrey | G06Q 10/10 709/204 |
| 2007/0198249 | A1* | 8/2007 | Adachi | G06F 17/2705 704/9 |
| 2010/0017260 | A1* | 1/2010 | Hamilton, II | G06Q 30/08 705/14.4 |
| 2010/0042468 | A1* | 2/2010 | Doan | G06Q 10/06 705/7.32 |
| 2011/0125580 | A1* | 5/2011 | Erhart | G06Q 30/0201 705/14.54 |
| 2011/0153373 | A1* | 6/2011 | Dantzig | G06F 17/30286 705/5 |
| 2012/0317492 | A1* | 12/2012 | Sheeder | H04N 21/25891 715/738 |
| 2014/0081766 | A1* | 3/2014 | Maass | G06Q 20/10 705/14.64 |
| 2014/0188478 | A1* | 7/2014 | Zhang | G10L 15/22 704/257 |
| 2015/0348048 | A1* | 12/2015 | Kurian | G06F 9/546 705/304 |
| 2016/0219149 | A1* | 7/2016 | Krishnan | H04M 3/5175 |
| 2016/0349935 | A1* | 12/2016 | Gelfenbeyn | G06F 3/0481 |
| 2017/0126891 | A1* | 5/2017 | Khodorenko | H04M 3/5232 |

\* cited by examiner

FIG. 3

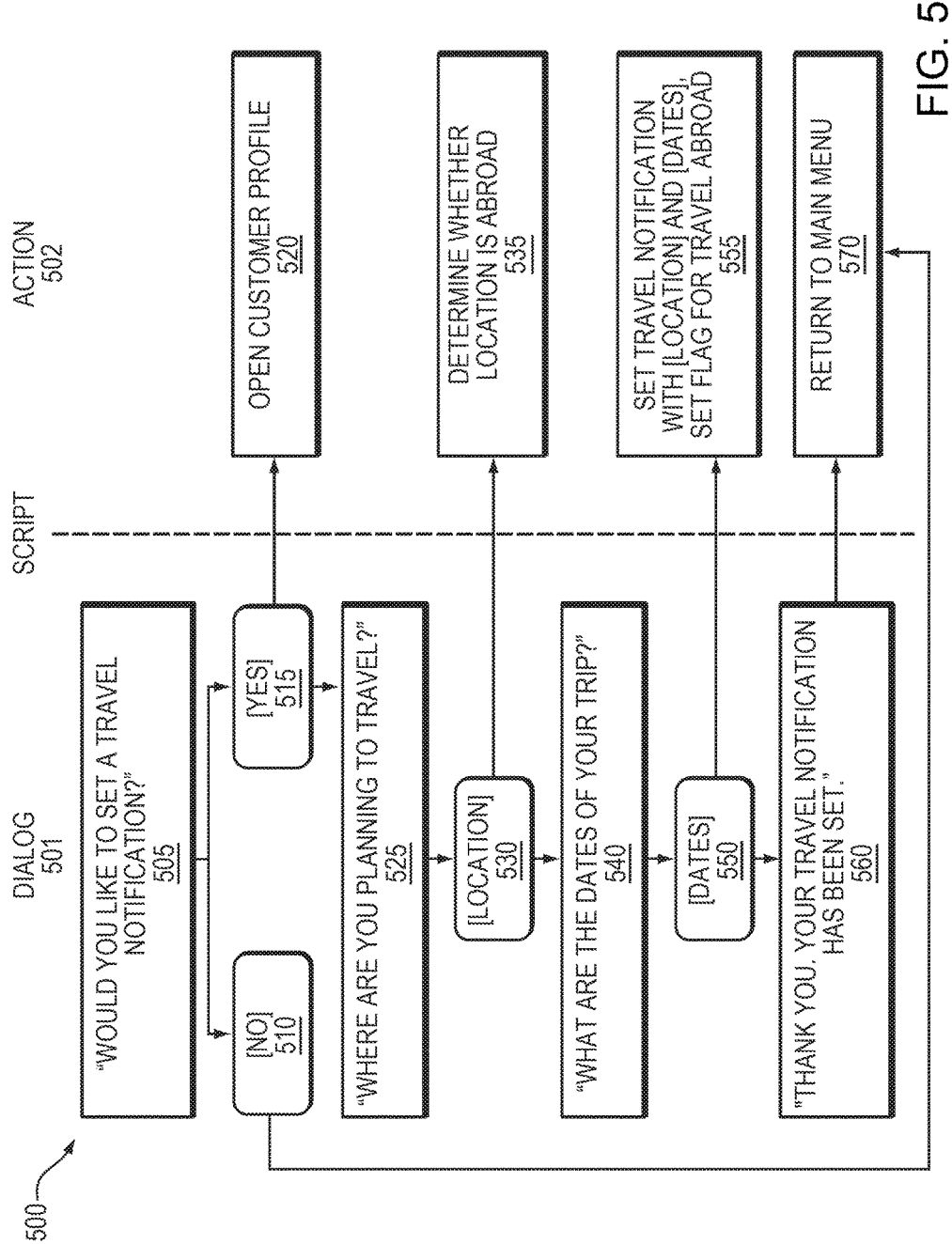

LEARNING AND AUTOMATING AGENT ACTIONS

BACKGROUND

Customer-oriented businesses operate in a wide range of industries, including retail sales, banking, and personal services. In order to maintain a relationship with their customers, these businesses often maintain services that allow the customers to interact with a representative of the business. In the past, a business would typically provide a "customer service" telephone number that the customer could call to speak with a representative. With the advent of online communications, businesses have begun providing online "chat" interfaces, accessed by the customer through a smartphone and/or a website, that allow the customer to communicate with a representative by text messages. Businesses have utilized both telephone calls and online messaging to accommodate their customers' preferences.

SUMMARY OF THE INVENTION

Example embodiments of the present invention include a method of processing customer requests. A request is parsed by an agent to identify key words of a request. A dialog conducted between a customer and an agent is also parsed, and operations taken by the agent during the dialog are monitored. These operations can include, for example, the agent's interaction with a computer terminal. Based on one or more of the key words, dialog, and monitored operations, an intent is identified. The intent may indicate an objective of the request, such as retrieving information from, or making changes to, the customer's account.

Further, a script may be generated based on the dialog and the monitored operations. The script can include a dialog tree between a subsequent customer and an automated agent. The script can also include instructions for the automated agent to perform one or more actions on the subsequent customer's account, where the actions are coupled to respective nodes of the dialog tree. A database can be updated to incorporate the script and the associated intent.

In further embodiments, the request may be the first of a plurality of requests that are processed. Subsequent requests may be processed in a manner comparable to the first request, but with the opportunity for an automated agent to utilize the script to handle the request in place of, or under the management of, the (e.g., human) agent. For example, a second request (made by a second customer) may be parsed to identify key words of the second request, and the key words can be compared against a database to locate a script for the second request. The key words may indicate an intent for the request, where the intent is associated with a script. If a script is found, it can be retrieved and executed by 1) conducting an automated dialog with the second customer based on the script, and 2) performing one or more actions on the second customer's account based on the script.

If a script cannot be located, the second request may be forwarded to an agent to handle the second request. While the second request is being handled, the dialog between the second customer and the agent may be parsed, and operations taken by the agent at the computer may be monitored. A second intent may be identified based on one or more of the key words, dialog, and monitored operations associated with the second customer, where the second intent indicates an objective of the second request. A second script, comparable to the first script, can be generated, and the database can be updated to incorporate the second script and the second intent.

In still further embodiments, an existing script in the database can be modified based on a subsequent interaction between a customer and an agent. For example, the intent of a subsequent request may be identified, and the interaction may be processed by parsing the customer/agent dialog and recording the operations taken by the agent. The existing script for the same intent may then be modified based on the new dialog and operations. Alternatively, a new script may be generated independent of the existing script, and the two (or more) scripts may be merged to create an updated script.

In yet further embodiments, the database may be updated by adding an entry to the database, where the entry includes the intent and the script. Alternatively, updating the database may include locating an existing script in the database, the existing script being associated with the intent; and modifying the existing script, based on the script, to generate a modified script, the modified script including portions of both the script and the existing script.

In still further embodiments, the operations taken by the agent can include accessing the customer's account at an account database, retrieving information from the customer's account, and modifying the customer's account. Monitoring the operations can include monitoring use of a user input device by the agent, the user input device including a keyboard, mouse, touchscreen, or voice interface. Each of the operations may be associated with a respective portion of the dialog based on a time at which each of the operations occurs relative to the dialog. Further, the dialog may be carried out via text messages on a messaging application, or by a telephone call. If the dialog is carried out by telephone, the spoken utterances by the customer and/or agent may be transcribed to obtain the request and/or the dialog.

Yet still further embodiments of the present invention include a method of processing customer requests. A request may be parsed to identify key words of the request, and the key words can be compared against a database to locate a script for the request. The key words may indicate an intent for the request, where the intent indicates an objective of the request. If a script is found, it can be retrieved and executed by 1) conducting an automated dialog with the second customer based on the script, and 2) performing one or more actions on the second customer's account based on the script.

If a script cannot be located, the request may be forwarded to an agent to handle the request. While the request is being handled, the dialog between the customer and the agent may be parsed, and operations taken by the agent at the computer may be monitored. An intent may be identified based on one or more of the key words, dialog, and monitored operations associated with the customer. A script can be generated, and the database can be updated to incorporate the second script and the second intent.

In still further embodiments, the key words may be compared against the database to determine the intent, and the database may be searched, based on the intent, to locate a script associated with the intent. Further, when executing the script, the customer's account may be accessed via a virtual desktop environment, where the actions include an operation within the virtual desktop environment. Parsing the dialog may include performing semantic parsing on the dialog to generate a semantic map of the dialog. Further, generating the script may include generating the dialog tree based on the semantic map of the dialog.

Still further embodiments may include a method of processing a plurality of customer requests. A plurality of customer requests are parsed to identify key words of the requests. A plurality of dialogs between the customer and an agent are parsed, the dialogs occurring in response to the plurality of customer requests. Operations taken by the agents at computer terminals during occurrence of the plurality of dialogs are monitored and/or recorded. An intent is identified based on at least one of the key words, dialog, and monitored operations, the intent indicating a common objective of the plurality of requests. A script is generated based on the plurality of dialogs and the monitored operations, the script including 1) a dialog tree between a subsequent customer and an automated agent, and 2) instructions to perform one or more actions on the subsequent customer's account, the actions being coupled to at least one node of the dialog tree. A database is updated to incorporate the script and the intent.

Further embodiments of the invention may include a computer system and/or a computer program product configured to provide a service entailing some or all of the processes described above.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 3 is a screenshot of a user interface that may be accessed by an agent.

FIG. 5 is a flow diagram of an example script.

DETAILED DESCRIPTION OF THE INVENTION

Figure 1:
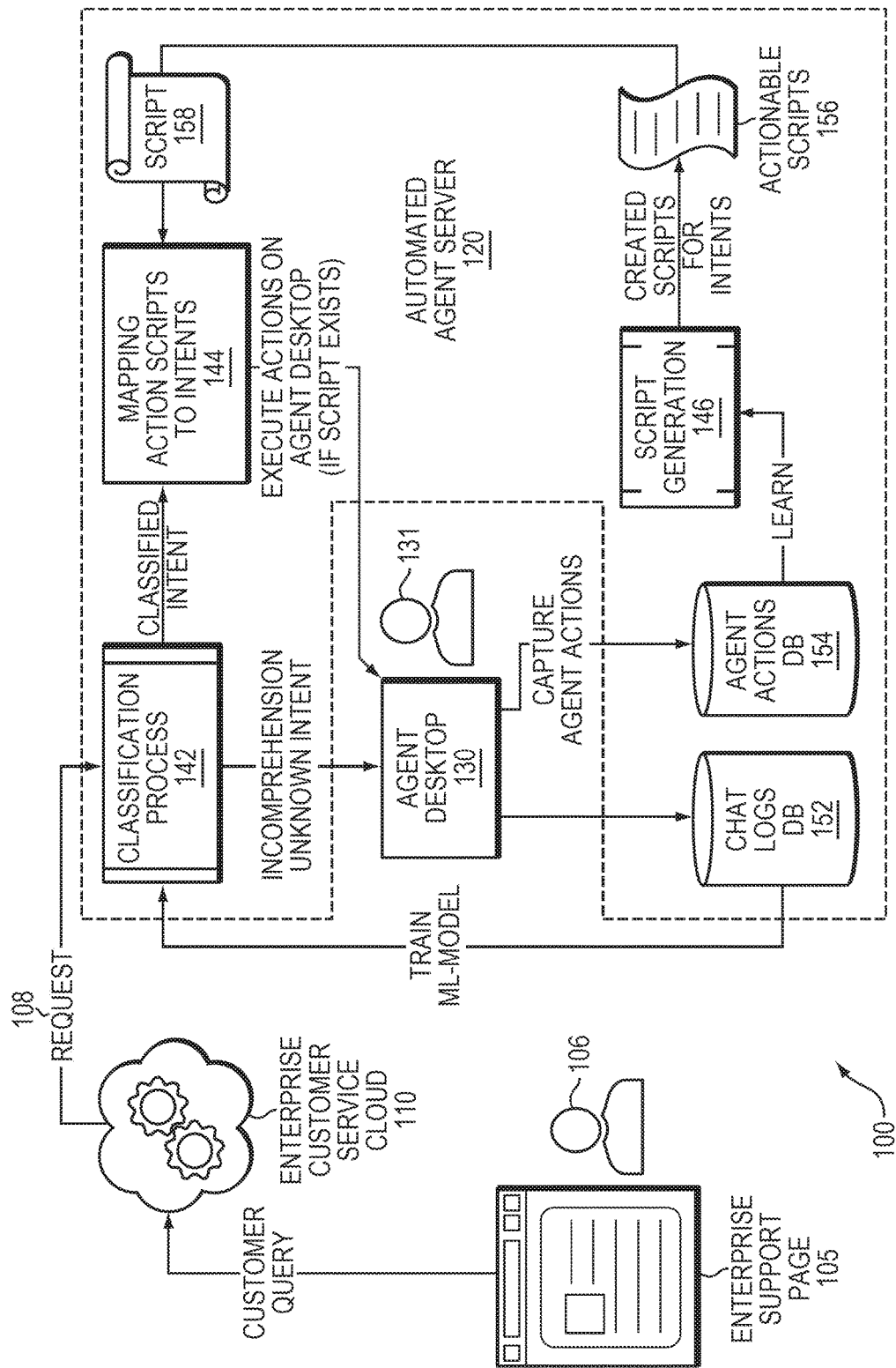
FIG. 1 is a block diagram of a system in which embodiments of the present invention may be implemented.

A description of example embodiments of the invention follows.

In order to address costs, wait times, and other drawbacks associated with employing human agents to interact with customers, businesses have begun employing automated response systems for responding to customer requests. These automated systems can be implemented in a networked computer system, and interact with a customer though an online text chat, a telephone call, or both. Earlier phone services provided a "phone tree," whereby the customer is presented with recorded messages, and is prompted to dial numbers on his/her telephone keypad to navigate the menus until arriving at the desired option.

More recently, automated systems have been developed to perform a rudimentary conversation with the customer. The customer makes a request, either by speaking the request at a telephone or typing the request at an online chat interface. The automated system then processes the customer's input and attempts to identify and then respond to the request. In the case of conducting a telephone call, the automated system must also process the customer's spoken utterances, and may implement, for example, a natural language understanding (NLU) application. By processing and responding to customer requests and inquiries, the automated system may supplement or replace the work of a human agent.

However, such automated systems face several drawbacks and limitations relative to a (human) customer service agent. First, the dialog performed by the system is predetermined, and cannot anticipate all of the statements that a customer might make during a conversation. As a result, the automated system may be unable to interpret and respond to a customer's request.

Further, an automated system may be unable to take an appropriate action in response the customer's request. Upon receiving a customer query, a customer service agent understands this query and further takes actions on his/her desktop to provide an appropriate response (e.g., accessing information from the customer's account, or updating the customer's account with new information). Automation of these agent actions using, for example, a backend or application program interface (API), may be complex and unreliable due to access conflicts or outdated and unmaintained code. Therefore, for an enterprise providing a customer service, automating the actions taken by an agent may be expensive and time-consuming.

Example embodiments of the present invention provide for recording and learning from customer/agent interactions, including the actions taken by the agent, in order to provide an automated agent for handling subsequent customer requests. Machine learning methods can be applied to classify intents from a customer query and to learn and automate agent actions. This automated agent can supplement or replace the functions of a (human) agent, thereby increasing the efficiency and productivity of a customer service.

Typically, when programming an automated system to handle customer requests, the challenge of backend integrations becomes a barrier to fully automating transactions. Example embodiments, in contrast, employ techniques for training an automated agent by mimicking what a human agent would do, and enabling the automated agent to access some or all of the tools the human agent does. This approach removes the need for any new integrations within the information system, as the automated agent may operate using the same or comparable tools (e.g., a desktop interface and software) available to a human agent.

Example embodiments provide an automated system for learning the actions taken by a human agent, including interaction with a customer and interaction with a computer interface, and developing an automated agent, based on the learning process, to interact with subsequent customers. In an example embodiment, a customer contacts a customer support service regarding a request (e.g., information on, or an update to, the customer's account). These queries can be classified using machine-learning methods to an existing "intent," which refers to the objective of the request. If the classification process identifies an intent with sufficient confidence, the request can be tagged with the intent. For example, a "string to vector" filter, combined with a bayesian process, may be used to create the intent classifier. In order to accurately identify a substantial number (e.g., 64) different intents, this classifier may be trained on a large number (e.g., 12,000) customer queries. If the intent of the request cannot be resolved, the request may be diverted to a customer service representative. Here, the agent tags the request with appropriate intent and takes actions (e.g., using a keyboard/mouse at a desktop terminal) to resolve the customer's request. The agent may interact with the customer via a telephone call, or by a text chat interface displayed at the agent's terminal. The interaction can be transcribed, if necessary, and recorded as a "chat log."

Along with the chat logs, a key logger may be applied to record the actions taken by the agent into an action repository, along with the intent that the actions were used to resolve. The actions are compiled into an "action sequence" with timestamps for each action, where the timestamps can be used to locate the time of each action relative to the chat log. In practice, not every customer agent would use the same actions to resolve a customer request. Thus, the recorded actions for several requests can be reviewed and processed to determine the most generic and appropriate actions to resolve a given customer request. Once the actions have been finalized for a particular intent, the actions can be automated for the agent desktop. Then, upon receiving a subsequent request with the same intent, the actions to handle the request can be automated using the actionable scripts from the script database. This automation may be initiated autonomously, or under the supervision of a human agent. If supervised, then, once the agent is satisfied with the executed actions, the agent can confirm the results and complete the request.

Embodiments of the invention provide a number of advantages over previous approaches in processing customer requests. By learning and identifying the actions taken by a human agent to resolve a customer query, an automated agent can be trained accurately and efficiently. Further, the actions taken by an agent on a desktop or other interface can be automated using scripts that capture agent desktop behaviors (e.g., through performing screen grabs and capturing click trails). This approach does not require any new backend functions to resolve the customer request, or even an integration to existing backend functions. Rather, an automated agent can perform actions through an interface comparable to the human agent's desktop console.

FIG. 1 is a block diagram of a system 100 in which embodiments of the present invention may be implemented. The system 100 may encompass a computer network 110 (e.g., a customer service cloud operated by an enterprise) whereby a customer 106 engages with a customer service of the enterprise using a customer interface 105 (e.g., a customer service webpage). Alternatively, the customer 106 may call a customer service telephone number, and access the customer service through a telephone call in place of the interface 105. The automated agent server 120 is configured to communicate with the customer 106 across the network 110. The server 120 may also be accessed by a customer service agent 131 through a desktop terminal 130. For example, the agent 131 may be located in a customer service call center for attending to requests made by customers of the enterprise, including the customer 106. The server 120 may be located at the call center, or may be remote from the call center. For example, the server 120 may be embodied as a cloud computing service accessible to both the agent 131 via the desktop terminal 130 and by the customer 106 via the customer interface 105.

When the customer 106 wishes to engage with the customer service provided by the enterprise (e.g., the customer 106 has a question about his/her account, wishes to update his/her account, or submits and order for a product or service from the enterprise), the customer 106 submits a request 108 through the interface 105, and the network 110 routes the request 108 to the automated agent server 120. The request 108 may be submitted by the customer 106 may be embodied in a text message typed by the customer, an utterance spoken by the customer 106 in a telephone call or other voice interface, a menu selection, or a comparable medium.

The server 120 may be configured generally to respond to a customer request in the following manner. First, a classification process 142 receives the request 108 and attempts to classify the request by matching it to one of a number of given intents (e.g., "check balance," "issue travel notification," or "update contact information"). If the request 108 can be classified to an intent, then the server 120 may perform a mapping process 144, where a script 158 matching the intent is retrieved from a script database 156. The script 158 may include a sequence of actions to be undertaken in response to the request 108, and/or a dialog tree for communicating with the customer 106 regarding the request 108. The script 158 may be executed at the agent's desktop terminal 130, optionally under the supervision of the agent 131, thereby resolving the request 158. Alternatively, the server 120 may include a process (e.g., hardware/software) for executing the script 158 independent from the desktop terminal 130.

If the request 108 cannot be classified to an intent, then the server 120 forwards the request 108 to the agent 131, who resolves the request 108 through the desktop terminal 130. To do so, the agent 131 may use the terminal 130 to conduct a text-based chat with the customer 106 and access/update the customer's account. If the agent 131 also conducts a telephone call with the customer 106, the call may be recorded and transcribed automatically using voice recognition software. The agent's actions at the desktop terminal 130 may be captured (e.g., by a keylogger and/or other desktop software) and collected as an action sequence to an agent actions database 154. Likewise, the agent's dialog with the customer 106 (either a text-based chat or a transcribed call) may be added to a chat log database 152. The server 120 can feed the action sequence to an script generation process 146 to create a new script (or modify an existing script) for a given intent, and update the script database 156 with the new or updated script. If the script is to include a dialog tree corresponding to an action sequence, then the server 120 may also implement the dialog stored at the chat log database 152 to create or update a dialog tree component of the script. The new or updated script, once completed and stored at the script database 156, may be used to handle subsequent customer requests in a manner similar to the script 158 described above. The server 120 can also utilize the dialogs in the chat log database 152 to train the classification process (e.g., via an automated machine learning process) to improve classification of subsequent requests.

Thus, the server 120 may classify an incoming customer request 108 by an intent and, if a script 158 is available for the intent, may automate some or all of the process of handling the request 108, independently or under the supervision of an agent 131. The automation may include performing a dialog with the customer 106 and/or performing actions comparable to the actions that would be performed by the agent 131 at a desktop terminal 130. If the server 120 cannot classify the request or locate a corresponding script, then the server 120 monitors the actions taken by the agent 131 in handling the request. Based on the monitored actions, the server 120 can provide a script for automating a response to subsequent replies matching the given intent.

Figure 2:
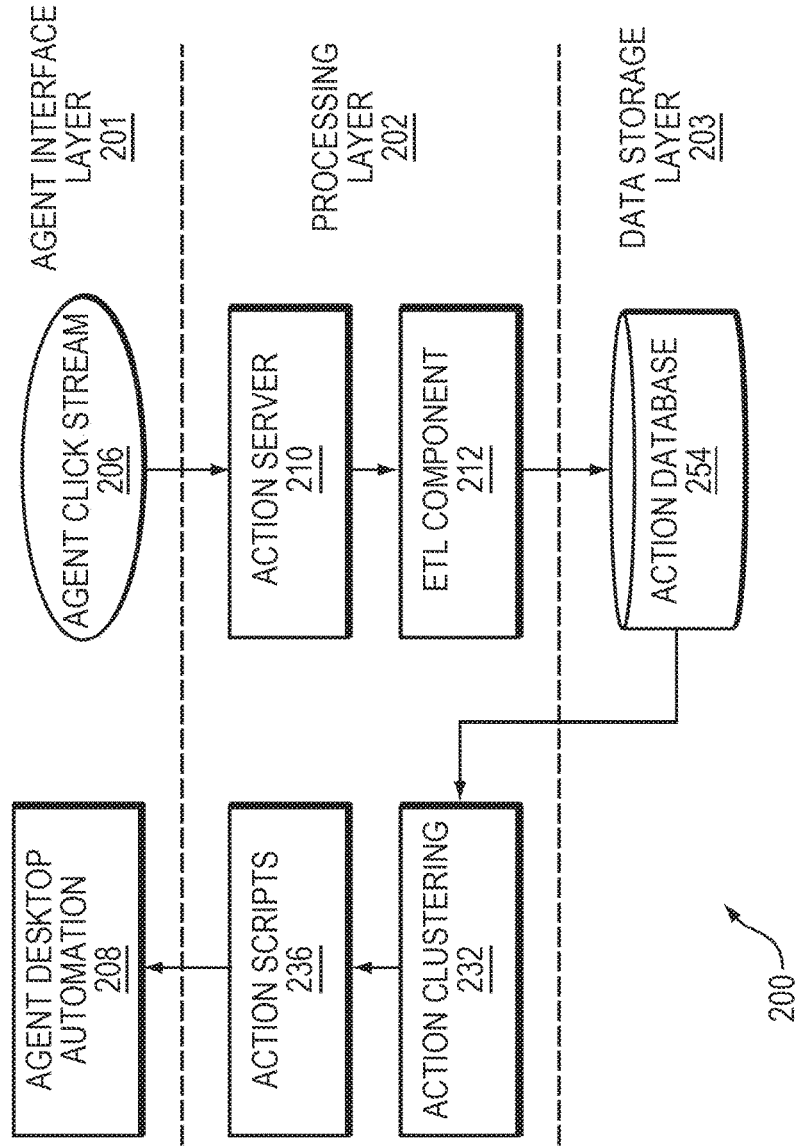
FIG. 2 is a flow diagram of a process of generating an automated response to a request in one embodiment.

FIG. 2 is a flow diagram of a process 200 of generating an automated response to a request in one embodiment. The process 200 may be implemented, for example, by the server 120 described above. Although an automated response may include conducting a dialog with a customer, performing an action in relation to the customer's account, or both a dialog and an action, the process 200 encompasses a process of automating actions.

With reference to the system 100 of FIG. 1, the process 200 occurs at an agent interface layer 201 (e.g., the desktop terminal 130), a processing layer 202 (e.g., hardware/software configured to provide the script generation process 146), and a data storage layer 203 (e.g., the actions database 154). At the agent interface layer 201, when the agent 131 performs actions at the desktop terminal 130, the agent 131 creates a "click stream" 206 that may be captured by desktop software such as a keylogger. Alternatively, the desktop software may be configured to capture metadata for the click stream, indicating higher-level actions taken by the agent 131, such as the functions of opening a customer's profile, modifying the profile address field, or adding a travel notification. This click stream 206 (or, alternatively, metadata) is forwarded to an action server 210 (e.g., a component of the server 120). An extract, transform and load (ETL) process 212 extracts the relevant data from the click stream indicating the agent's actions, and stores the extracted action data to an action database 254 (e.g., database 154). For example, the ETL process 212 may derive metadata, comparable to the metadata described above, from the click stream, where the metadata is stored to the action database 254.

The server 120 then employs the extracted action data to create an action script for automating actions for responding to a customer request. In replying to a request, an agent may perform a range of different actions that will vary between multiple requests, even when those multiple requests can be classified with the same intent. Thus, an action clustering process 232 may receive the extracted action data for a plurality of agent replies, where each of the replies relates to a request classified with the same intent. The action clustering process 232 processes the replies to determine an appropriate sequence of actions for replying to a request for the given intent. For example, the process 232 may determine which of the extracted actions are common across the multiple different replies, or derive a "generic" action sequence that resolves the request.

Based on the action clustering process 232, the server 120 creates an action script 236, which is a sequence of actions for performing at the agent's desktop terminal 131. The script may be stored at a script database (e.g., script database 156). If the action script 232 is to be used with a dialog tree for automating interaction with a customer, then the action script 232 may be merged with the dialog tree to provide a combined action/dialog script, an example of which is described below with reference to FIG. 5. An agent desktop automation process 208 may be run on the agent's desktop terminal 130. The process 208 may operate independently or under the supervision of the agent 131, and imports the action script 236 in response to receiving a request matching the intent associated with the script 236. The process 208 then executes the script 236 to perform the appropriate actions at the agent's desktop 130, thereby responding to the customer's request. Alternatively, the process 208 may be operated by the server 120, such as within a virtual desktop environment or other process configured to access a customer's account in a manner comparable to the agent's desktop terminal 131.

Figure 3:
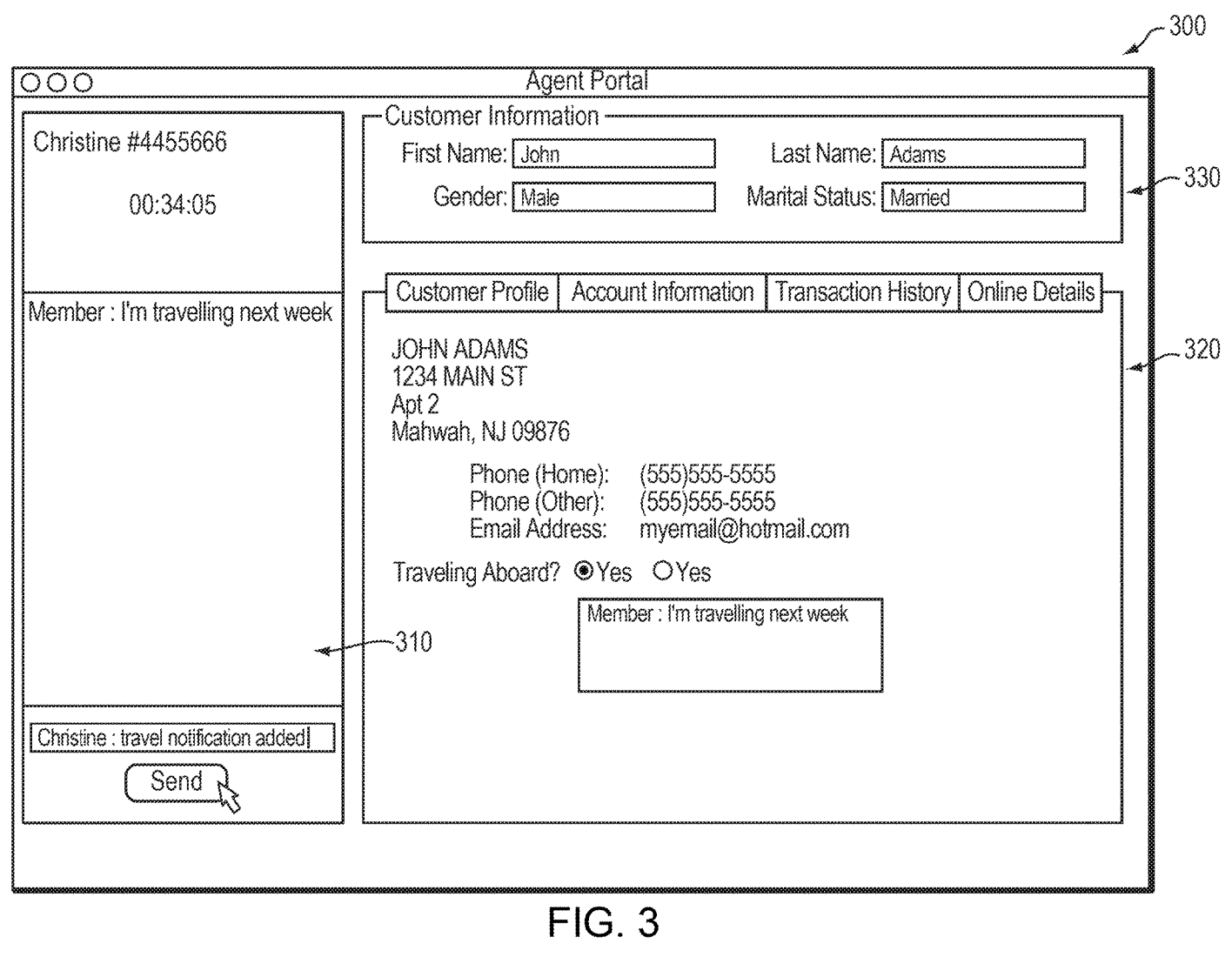

FIG. 3 is a screenshot of a user interface window 300 that may be accessed by an agent. With reference to the system 100 of FIG. 1, for example, when the server 120 receives a request 108 from the customer 106, the window 300 may display at the desktop terminal 130 of the agent 131 assigned to the request 108. The agent 131 may interact with the window 300 at the desktop terminal 130 when responding to the request 108. Through the window 300, the agent 130 may interact with the customer 106, access the customer's information, and modify the customer's account. In particular, the window 300 includes an information panel 330, which provides basic information about the customer 106 (e.g., name, gender). A dialog panel 310 enables the agent 130 to conduct a text-based dialog with the customer 106. Alternatively, the panel 110 may be omitted if the agent 130 and customer 106 conduct a telephone call or other method of communication. Lastly, a customer account panel 320 displays more detailed information about the customer's account, and includes fields that may be modified by the agent 130 when responding to the request 108. The panel may include multiple tabs (e.g., "customer profile," "account information," "transaction history," "online details") that may be navigated by the agent 131 to access and update the customer's account.

Referring again to FIG. 2, the process 200 may extend to interactions with the window 300. For example, some or all of the agent's interaction with the window 300 may generate the agent click stream 206 that is processed, as described above, to generate a script. Further, the agent desktop automation process 208, which may be run on the agent's desktop terminal 130, may interact with the window 300 when executing a script. For example, the process 208 may conduct a chat with the customer at the dialog panel 310 using a dialog tree, and may manipulate the customer account panel 320 to access and update the customer's account, either independently or under the supervision of an agent 131.

Figure 4A:
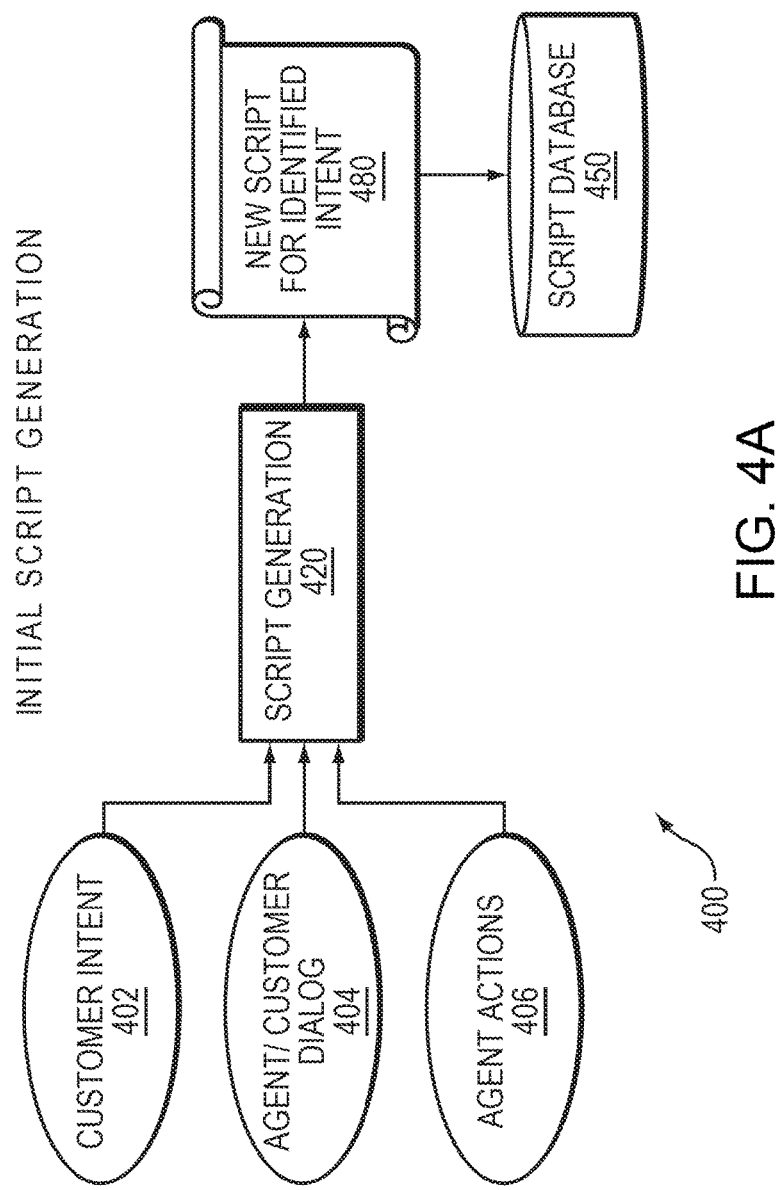
FIG. 4A is a flow diagram illustrating a process of generating an initial script.

FIG. 4A is a flow diagram illustrating a process 400 of generating an initial script. The process 400 may be implemented, for example, by the server 120 described above with reference to FIG. 1, and may include features of the process 200 of generating an automated response of FIG. 2. The process 400 may be initiated after an agent has completed a response to a customer request, and information about the request and response (e.g., intent, dialog and actions taken by the agent) has been collected.

With reference to FIG. 1, the server 120 may receive, as inputs to the process 400, a customer intent 402, an agent/customer dialog 404, and agent actions 406. The customer intent 402 indicates the classified intent corresponding to the request 108, and may be derived from the classification process 142 as described above. If the classification process 142 cannot determine the customer intent 402, then the agent 131 may determine the intent 402 when responding to the request 108. The agent/customer dialog 404 may include a transcript of a dialog between the agent 131 and customer 106 (e.g., a text-based chat or a voice call transcribed using automatic speech recognition (ASR) software), and may be retrieved from a database such as the chat logs database 152. Likewise, agent actions 406 may include information about the actions taken by the agent 131 while responding to the request 108, such as a click stream (e.g., click stream 206 described above with reference to FIG. 2) or metadata regarding the click stream, and may be retrieved from a database such as the agent actions database 154.

The server 120 may input the customer intent 402, agent/customer dialog 404 and agent actions 406 to a script generation process 420, which may include features of the script generation process 146 described above. From these inputs, the process 420 produces a new script 480 for the given intent. Although the script 480 can be generated from a dialog and agent actions from a single request response, the process 420 may also incorporate the responses to a plurality of requests associated with a common intent. Thus, multiple different recorded responses may be integrated into a single script 480. Alternatively, for creating a script composed only of a dialog tree, or a script composed only of an action sequence, the process 420 may omit the agent actions 406 or agent/customer dialog 404, respectively. An example process of script generation is described in further detail below with reference to FIG. 7.

Once generated, the script 480 may be stored to a script database 450 (e.g., script database 156) and associated with the given customer intent, where it may be retrieved and utilized by the server 120 to provide an automated response to a subsequent request matching the given intent.

Figure 4B:
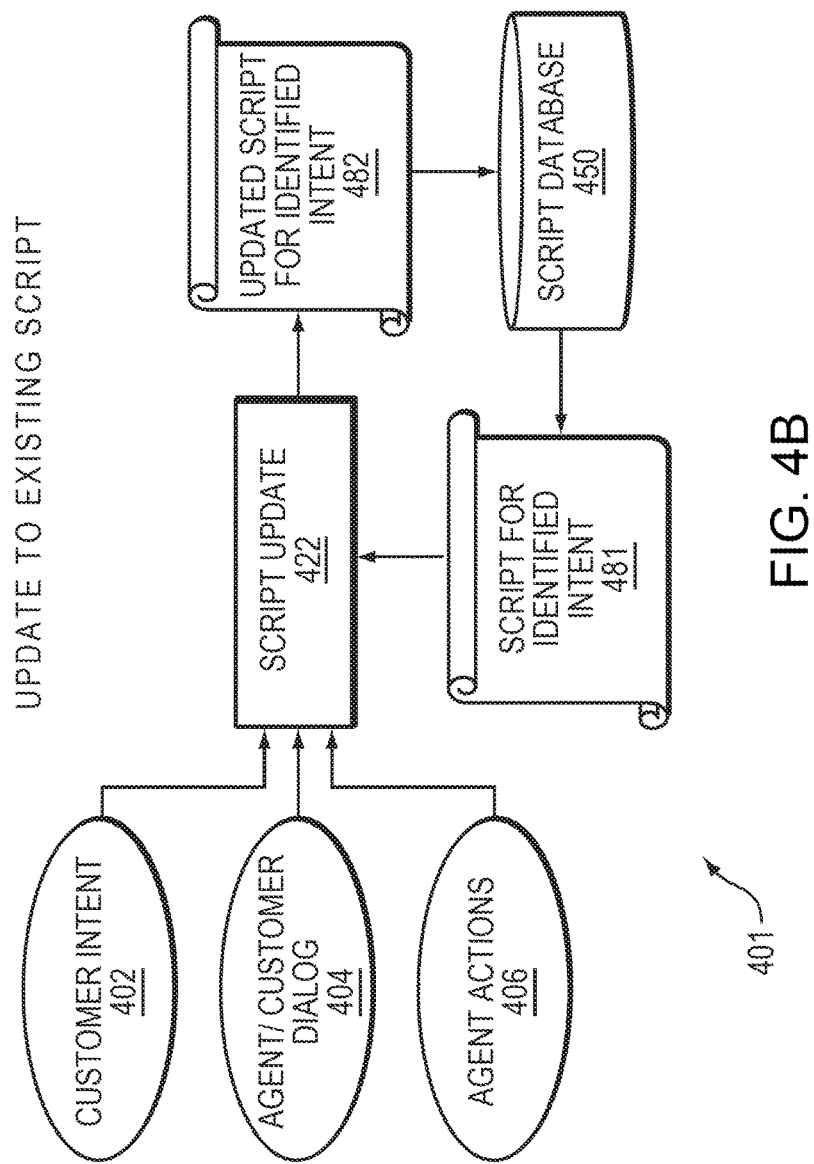
FIG. 4B is a flow diagram of a process of updating an existing script.

FIG. 4B is a flow diagram of a process 401 of updating an existing script. The process may include some or all of the features of the process 400 described above, with the exception that a script update process 422, in place of the script generation process 420, receives an existing script 481 for the given intent in addition to the intent 402, dialog 404 and agent actions 406. The existing script 481 may have been previously generated by the script generation process 420, or may have been programmed manually. For example, an agent or other user may program an initial script, including a dialog tree and/or an action sequence, which can be updated and improved by the script update process 422 based on subsequent customer interactions. In particular, the script update process 422 may modify the existing script 481 based on the agent/customer dialog 404 and the agent actions 406 to create an updated script 482, which may be added to the script database 450.

Alternatively, with reference to FIG. 1, an automated server 120 implementing the process 401 may update an existing script 481 based on previous automated responses to customer requests (i.e., responses undertaken, at least in part, by an automated agent executing a script, rather than a human agent alone). In such a case, the agent/customer dialog 404 and agent actions 406 may include data from previous automated responses, including dialog between an automated agent and a customer and/or actions taken by the automated agent, independently or under the supervision of an agent (e.g., agent 131). As a result, the process 401 can be used to improve subsequent responses by an automated agent based on previous responses by the automated agent. Further, the process 401 may be employed in a recursive manner, with a succession of response data over time, to continually improve the performance of an automated agent.

FIG. 5 is a flow diagram of an example script 500. The script 500 includes a dialog tree 501 and an action sequence 502 that are linked by corresponding segments. The segments of the action sequence 502 may also have respective timestamps (not shown), which may be referenced when executing the script 500. The script 500 illustrates an example response to a customer request, where the request pertains to setting a travel notification for the customer's account. With reference to FIG. 1, before executing the script 500, the server 120 performs the classification process 142 to identify the intent of the request 108. The intent may be labeled, for example, "set travel notification." Once classified by intent, the server 120 may retrieve and execute the script 500, operating as an automated agent.

The script 500 begins with the dialog tree 501, where the server 120 asks the customer 106 to confirm the intent with the question, "Would you like to set a travel notification?" (505). If the customer 106 responds in the negative (510) (where a range of customer responses may be registered as [NO]), then the server 120 returns to a main menu (570). If the customer 106 confirms (515), then the server 120 opens the customer's profile (e.g., at an agent desktop terminal 130) (520), and asks the customer a further question, "Where are you planning to travel?" (525). The server 120 then parses the customer's response to determine the [LOCATION], indicating where the customer will be traveling (530). The server 120 determines whether this location is abroad (535). The server 120 then asks the customer 106 "What are the dates of your trip?" (540), and parses the customer's response to determine the [DATES], indicating when the customer 106 will be traveling (550). The parsing may include performing semantic parsing on the dialog to generate a semantic map of the dialog.

Based on the provided location and dates of travel, the server 120 then updates the customer's account to set a corresponding travel notification (555). If the location was determined to be abroad, then the server 120 may also set a corresponding flag on the customer's account. Referring back to FIG. 3, the customer account panel 320 illustrates a customer account that is updated with a travel notification, including a flag indicating travel abroad. Once the travel notification is set, the server 120 confirms with the statement "Thank you. Your travel notification has been set," and returns the customer 106 to the main menu 570 for further requests.

The script 500 is simplified for illustrative purposes, and may include several more branches of the dialog tree 501 in order to parse and respond to a larger range of statements and questions that may be presented by the customer 106. The dialog tree 501 may also include loops to repeat branches in order to confirm statements by the customer 106. The server 120 may execute the dialog tree 501 via a text chat, for example by operating the dialog panel 310 of the user interface window 300 of FIG. 3. Alternatively, the server 120 may communicate with the customer 106 through an audio channel (e.g., a telephone call), where the server executes the dialog tree 501 using a text-to-speech process, and interprets the customer's statements using an ASR process.

In alternative embodiments, the script 500 may include only the dialog tree 501 or the action sequence 502 at the exclusion of the other. In such an embodiment, when responding to a customer request, an automated agent (e.g., automated agent server 120 in FIG. 1) may perform either the dialog tree 501 or the action sequence 502 as provided by the script 500, while a human agent (e.g., agent 131) performs the portion not provided by the script 500, being either a dialog with the customer or actions at a desktop terminal. The agent may initiate and/or supervise the automated agent as it executes the script, thereby controlling the automated agent to provide actions or dialog to complement those undertaken by the agent.

Figure 6:
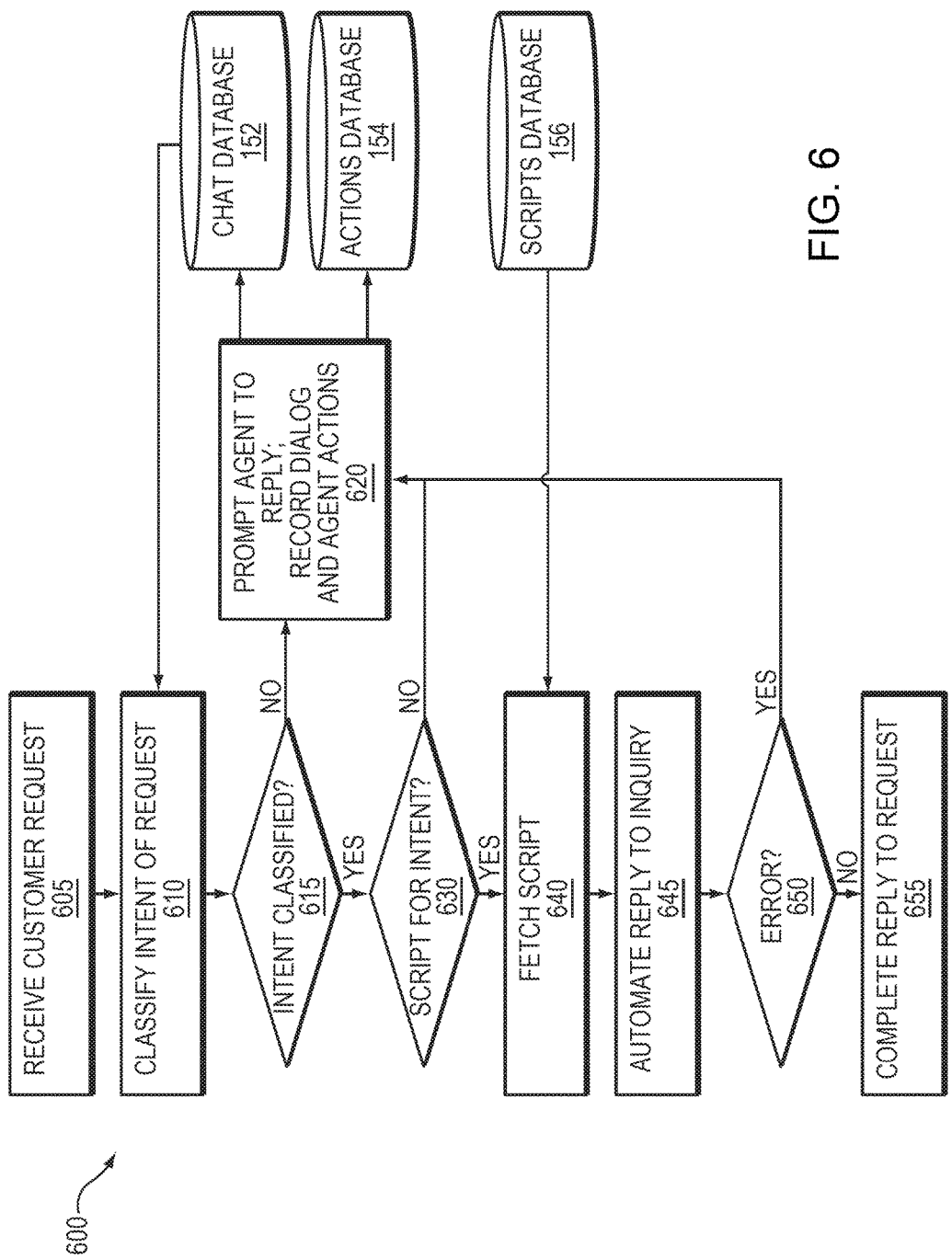
FIG. 6 is a flow diagram of a process of handling a request in one embodiment.

FIG. 6 is a flow diagram of a process 600 of handling a request in one embodiment. The process 600 may be performed by the server 120 of FIG. 1, and may incorporate features described above with reference to FIGS. 1-5. With reference to FIG. 1, the server 120 receives a customer request 108 (605) and attempts to classify the request 108 by intent (e.g., via classification process 142) (610). If the request cannot be classified by intent (615), or a script cannot be located for the intent (630), then the request 108 may be forwarded to the agent 131, and the server 120 may prompt the agent 131 to respond to the request 108 (620). While the agent 131 responds to the request 108, the server 120 records the customer/agent dialog and adds it to the chat logs database 152, and records the actions taken by the agent 131 and stores the actions to the actions database 154.

If the request 108 is successfully classified by intent (615) and a script is available for the intent (630), then the script 158 is retrieved from the script database 156 (640). Once retrieved, the server 120 executes the script 158 to automate a reply to the request 108 (645). During the automated reply, the server 120 may detect an error, such as a failure to interpret a statement made by the customer 106, or detecting that the customer 106 requests service by the agent 131. If so, then the server 120 forwards the request 108 to the agent 131 and records the response by the agent 131 as described above (620). Otherwise, the server 120 successfully completes the reply to the request 108 (655).

Figure 7:
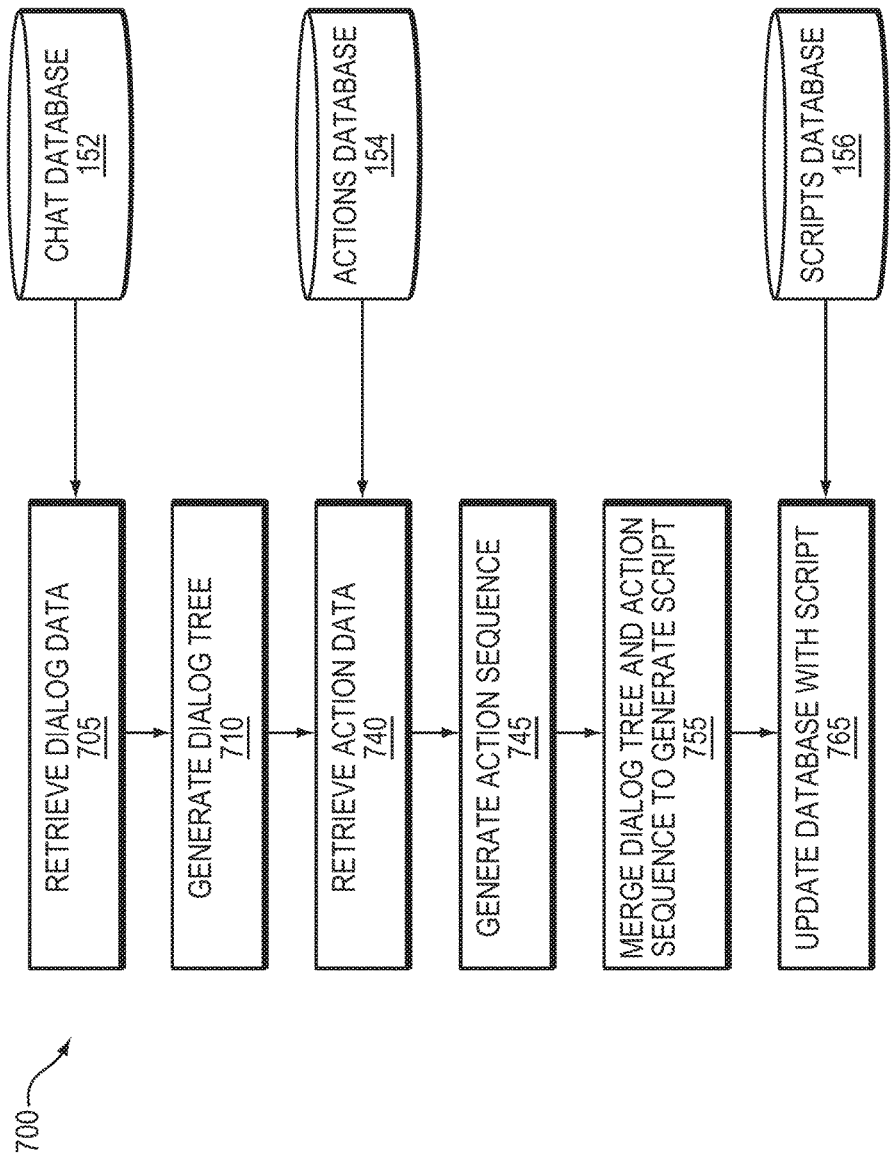
FIG. 7 is a flow diagram of a process of learning agent actions and dialog to create a script.

FIG. 7 is a flow diagram of a process 700 of learning agent actions and dialog to create a script. The process 600700 may be performed by the server 120 of FIG. 1, and may incorporate features described above with reference to FIGS. 1-5. With reference to FIG. 1, the server 120 retrieves dialog data from the chat log database 152 (705), which may include data from one or more responses associated with a given intent. Based on the dialog data, the server 120 may generate a dialog tree (710). This process may include features described above regarding generation of the dialog tree 501 of FIG. 5. For example, the server 120 may transpose the dialog data onto a dialog tree template, and automatically fill in branches of the dialog tree that do not occur in the dialog data (e.g., alternative responses by the customer and counter-responses to the same). Optionally, the server 120 may generate a first draft of the dialog tree, which is then reviewed and revised by an agent or other user to provide a finalized dialog tree.

The server 120 then retrieves action data from the action database 154 (740), which may include data from one or more responses associated with the given intent. Based on the action data, the server 120 may generate an action sequence (745). This process may include features described above regarding generation of the action sequence 502 of FIG. 5. As with the dialog tree, the server 120 may generate a first draft of the action sequence, which is then reviewed and revised by an agent or other user to provide a finalized action sequence. Each segment of the action sequence may include a timestamp or other marker such that it can be aligned with a corresponding segment of the dialog tree.

Once the dialog tree and action sequence and completed, the server 120 merges them to produce a script, such as the script 500 of FIG. 5 (55). This process may include features of the script generation process 400 described above with reference to FIG. 4A. In doing so, the server 120 may link corresponding segments of the dialog tree and action sequence based on metadata such as timestamps, thereby creating a process flow that extends through both the dialog tree and the action sequence. Once the script is completed, the server 120 may add the script to the script database 156 (765). If an existing script for the given intent already occupies the script database 156, then the server 120 may undertake the process 401 of updating the existing script as described above with reference to FIG. 4B. Alternatively, the script database 156 may retain more than one script for the given intent, which may be used for testing purposes or to merge into a combined script at a later time.

Figure 8:
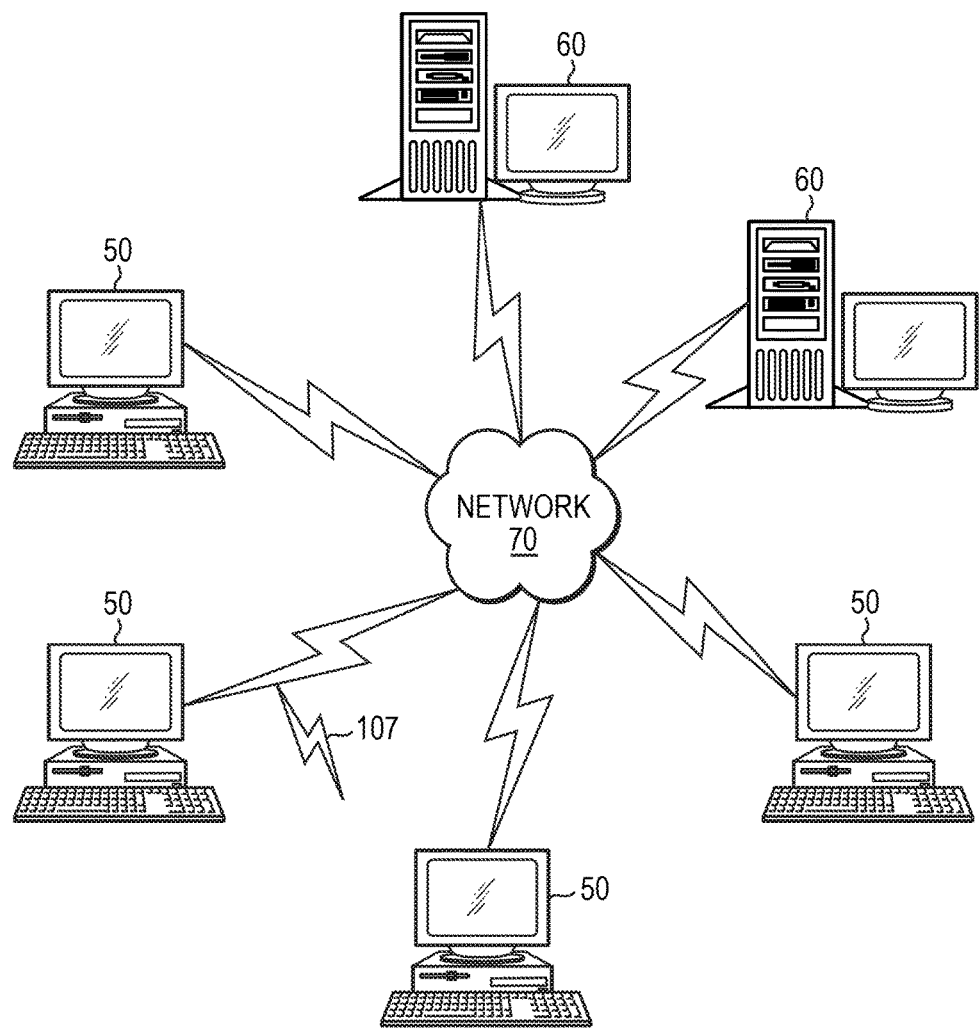
FIG. 8 illustrates a computer network or similar digital processing environment in which embodiments of the present invention may be implemented.

FIG. 8 illustrates a computer network or similar digital processing environment in which example embodiments may be implemented. Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Embodiments described above, with reference to FIGS. 1-7, may be implemented in the computer network. For example, the automated agent server 120 may be embodied by one or more of the server computers 60, and may communicate with a client 106 operating a client device 50. An example server 60 or device 50 is described in further detail below with reference to FIG. 9.

Figure 9:
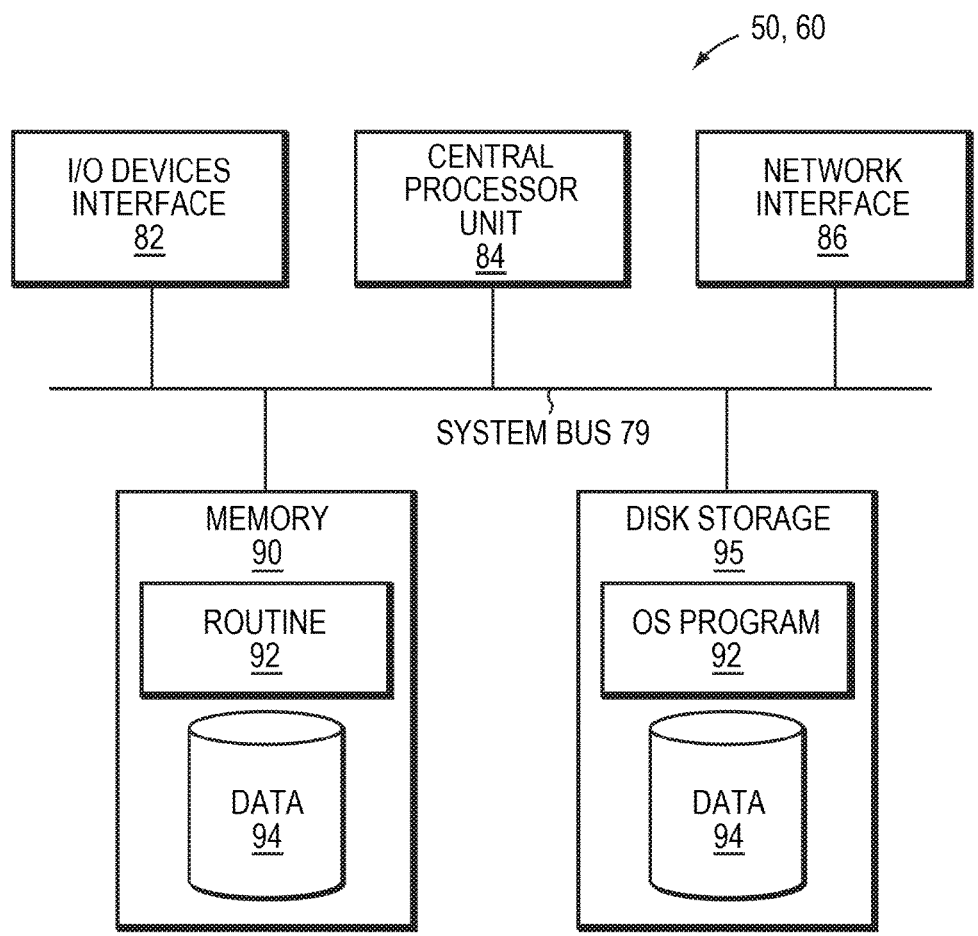
FIG. 9 is a diagram of an example internal structure of a computer in the computer system of FIG. 8.

FIG. 9 is a diagram of the internal structure of a computer system 50 (e.g., client processor/device 50 or server computers 60) in which example embodiments of the invention may be implemented. The computer system 50 includes system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50. Network interface 86 allows the computer to connect to various other devices attached to a network. Memory 90 provides volatile storage for computer software instructions 92 and data 94 used to implement an automated management system using a model based architecture assembly (e.g., multilayered mathematical model 12 and monitor 42, interpreter 44, rules engine 38 and supporting code 32, 34, 36, business ephemeris 22, 24, 26 and other features code detailed above in FIGS. 1-6), as well as other embodiments of the present invention (detailed below). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

While this invention has been particularly shown and described with references to example embodiments thereof, it will be understood by those skilled in the art that various changes in form and details may be made therein without departing from the scope of the invention encompassed by the appended claims.

What is claimed is:

1. A method of processing customer requests, comprising:
   parsing a request by a customer to identify key words of the request;
   parsing a dialog between the customer and an agent;
   monitoring operations taken by the agent at a computer terminal during occurrence of the dialog;
   identifying an intent based on at least one of the key words, dialog and monitored operations, the intent indicating an objective of the request;
   generating a script based on the dialog and the monitored operations, the script including 1) a dialog tree between a subsequent customer and an automated agent, and 2) instructions for the agent to perform at least one action on the subsequent customer's account, the at least one action being coupled to at least one node of the dialog tree; and
   updating a database to incorporate the script and the intent.

2. The method of claim 1, wherein the request is a first request by a first customer, and further comprising:
   parsing a second request by a second customer to identify key words of the second request;
   comparing the key words against the database to locate an existing script for the second request;
   in response to locating the existing script for the second request in the database:
      retrieving the existing script from the database, and
      executing the existing script by 1) conducting an automated dialog with the second customer based on the script, and 2) performing at least one action on the second customer's account based on the script; and
   in response to failing to locate the existing script for the second request:
      forwarding the second request to the agent,
      parsing a dialog between the second customer and an agent;
      monitoring operations taken by the agent at the computer terminal during occurrence of the dialog;
      identifying a second intent based on at least one of the key words, dialog and monitored operations associated with the second customer, the second intent indicating an objective of the second request;
      generating a second script based on the dialog and the monitored operations, the second script including 1) a second dialog tree between the subsequent customer and the automated agent, and 2) instructions to perform at least one action on the subsequent customer's account, the at least one action being coupled to at least one node of the second dialog tree; and
      updating the database to incorporate the second script and the second intent.

3. The method of claim 1, wherein the request is a first request by a first customer, and further comprising:
   parsing a second request by a second customer to identify key words of the second request;
   parsing a dialog between the second customer and the agent;
   monitoring operations taken by the agent at a computer terminal during occurrence of the dialog;
   identifying an intent for the second request based on at least one of the key words, dialog, and monitored operations, the intent for the second request matching the intent for the first request; and
   updating the database to modify the script based on the dialog between the second customer and the agent and the monitored operations.

4. The method of claim 1, wherein updating the database includes adding at least one entry to the database, the at least one entry including the intent and the script.

5. The method of claim 1, wherein updating the database includes:
   locating an existing script in the database, the existing script being associated with the intent; and
   modifying the existing script, based on the script, to generate a modified script, the modified script including portions of both the script and the existing script.

6. The method of claim 1, wherein the operations taken by the agent include at least one of accessing the customer's account at an account database, retrieving information from the customer's account, and modifying the customer's account.

7. The method of claim 1, wherein monitoring the operations includes monitoring use of a user input device by the agent, the user input device including at least one of a keyboard, mouse, touchscreen, and voice interface.

8. The method of claim 1, further comprising associating each of the operations with a respective portion of the dialog based on a time at which each of the operations occurs relative to the dialog.

9. The method of claim 1, further comprising transcribing spoken utterances by at least one of the customer and the agent to obtain at least one of the request and the dialog.

10. A method of processing customer requests, comprising:
    parsing a request by a customer to identify key words of the request;
    comparing the key words against a database to locate a script for the request;
    in response to locating a script for the request in the database:
       retrieving the script from the database, and
       executing the script by 1) conducting an automated dialog with the customer based on the script, and 2) performing at least one action on the customer's account based on the script; and
    in response to failing to locate a script for the request:
       forwarding the request to an agent,
       parsing a dialog between the customer and an agent;
       monitoring operations taken by the agent at a computer terminal during occurrence of the dialog;
       identifying an intent based on at least one of the key words, dialog and monitored operations, the intent indicating an objective of the request;
       generating a script based on the dialog and the monitored operations, the script including 1) a dialog tree between a subsequent customer and an automated agent, and 2) instructions to perform at least one action on the subsequent customer's account, the at least one action being coupled to at least one node of the dialog tree; and updating a database to incorporate the script and the intent.

11. The method of claim 10, further comprising:
comparing the key words against the database to determine the intent; and
searching the database, based on the intent, to locate a script associated with the intent.

12. The method of claim 10, wherein executing the script includes accessing the customer's account via a virtual desktop environment, the at least one action including an operation within the virtual desktop environment.

13. The method of claim 10, wherein parsing the dialog includes performing semantic parsing on the dialog to generate a semantic map of the dialog.

14. The method of claim 13, wherein generating the script includes generating the dialog tree based on the semantic map of the dialog.

15. A method of processing customer requests, comprising:
parsing a plurality of customer requests to identify key words of the requests;
parsing a plurality of dialogs between the customer and an agent occurring in response to the plurality of customer requests;
monitoring operations taken by the agents at computer terminals during occurrence of the plurality of dialogs;
identifying an intent based on at least one of the key words, dialog and monitored operations, the intent indicating a common objective of the plurality of requests;
generating a script based on the plurality of dialogs and the monitored operations, the script including 1) a dialog tree between a subsequent customer and an automated agent, and 2) instructions to perform at least one action on the subsequent customer's account, the at least one action being coupled to at least one node of the dialog tree; and
updating a database to incorporate the script and the intent.

16. The method of claim 15, wherein parsing the plurality of dialogs includes performing semantic parsing on the plurality of dialogs to generate a semantic map of the plurality of dialogs.

17. The method of claim 16, wherein generating the script includes generating the dialog tree based on the semantic map of the plurality of dialogs.

18. The method of claim 15, further comprising associating the at least one action with a respective portion of the dialog based on a time at which each of the operations occurs relative to the dialog.

19. The method of claim 15, further comprising transcribing spoken utterances by at least one of the customer and the agent to obtain at least one of the requests and the plurality of dialogs.

* * * * *